9/9/86 OR 4,611,110 SR

United States Patent [19]
Astner et al.
[11] Patent Number: 4,611,110
[45] Date of Patent: Sep. 9, 1986

[54] METHOD AND APPARATUS FOR CONNECTING A PLASMA GENERATOR TO A REACTOR

[75] Inventors: Gunnar Astner; Örjan Wstergren; Jan Thörnblom, all of Hofors, Sweden

[73] Assignee: SKF Steel Enginering AB, Hofors, Sweden

[21] Appl. No.: 595,295

[22] Filed: Mar. 30, 1984

[30] Foreign Application Priority Data

Sep. 1, 1983 [SE] Sweden ............................ 8304722

[51] Int. Cl.[4] ............................................ B23K 9/00
[52] U.S. Cl. ........................... 219/121 PY; 156/345; 219/121 PE; 219/121 PG
[58] Field of Search ................ 219/121 PD, 121 PG, 219/121 PE, 383, 121 PY; 315/111.12, 111.31; 204/192 E, 298; 313/231.31, 231.41, 231.51; 156/345, 643, 646

[56] References Cited

U.S. PATENT DOCUMENTS 3,705,975 12/1972 Wolf et al. ......................... 219/383
4,336,438 6/1982 Uehara et al. ................ 219/121 PG

*Primary Examiner*—M. H. Paschall
*Attorney, Agent, or Firm*—Armstrong, Nikaido, Marmelstein & Kubovcik

[57] ABSTRACT

A method of and apparatus for effecting rapid, reliable and risk-free, pressure-tight connection of a plasma generator to a reactor, such as a shaft furnace for metal oxide reduction. First electrical contact means arranged on a plasma generator, substantially enclosed by a cover, automatically connect the plasma generator to stationary second contact means when the plasma generator is moved by remote-control to a fully installed operating position from a partially installed sealing position in which the plasma generator has its front end partially inserted in the reactor tuyere and seals the reactor. A remote-controlled valve, which seals the reactor from the surroundings when the plasma generator is in an outer completely retracted position, is opened once the plasma generator is in its sealing position, after which the plasma generator is moved to its operating position. Remote-controlled locking bars are caused to press and lock the plasma generator to the reactor in order to effect pressure-tight connection, and at the same time the locking bars connect the plasma generator to the return conductor to the current source, thus providing extra security against the current circuit being connected before a pressure-tight seal has been achieved.

25 Claims, 2 Drawing Figures

METHOD AND APPARATUS FOR CONNECTING A PLASMA GENERATOR TO A REACTOR

Figure 1:
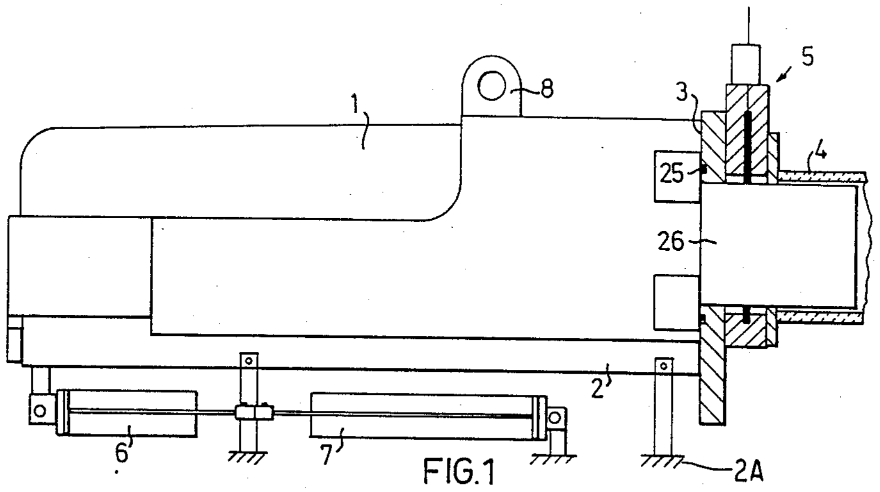

The present invention relates to a method for connecting a plasma generator to a reactor, for industrial processes, and apparatus therefor.

Plasma generators have hitherto been used to only a very limited extent in industrial processes. In the few existing cases the plasma generators are poorly suited to industrial environments in which they must, without fail, be simple and safe to operate.

An example of a plasma generator designed for industrial application is that described in U.S. Pat. No. 3,705,975. This plasma generator is provided with a flange which, with the aid of bolts distributed around the periphery, is to provide a pressure-tight connection. The plasma generator is lifted and positioned, and then the bolts are tightened, and the reverse sequence applies for removal. This is an extremely time-consuming and complicated process.

Another considerable drawback of earlier known plasma generator installations is that the high-voltage cable must be connected manually.

Industrial processes are usually continuous, and maximum availability is therefore sought after. The operating interval of a plasma generator between servicing shut-downs is limited, primarily be electrode wear, and the generators must therefore be regularly exchanged. It is therefore vital to minimize the exchange time.

Plasma generators require voltages in the vicinity of a few thousand volts and they must be well enclosed in order to prevent personnel from coming into contact with the high voltage and also to protect the generator from dust and liquid.

Usually the reactor to which the plasma generator is connected is provided with several plasma generators and it is then important that one of them can be exchanged without the other having to be taken out of operation.

The object of the present invention is thus to provide for rapid, reliable and risk-free, pressure-tight connection of a plasma generator to a reactor, and to achieve a method and means for connecting a plasma generator to a reactor during operation. Also, in order to achieve this, pressure-tight sealing of the reactor is to be effected during the exchange, and at the same time the high voltage cable should be automatically disconnected from the plasma generator.

Accordingly the present invention provides a method of effecting pressure-tight connection of a plasma generator to a reactor comprising moving the plasma generator from an outer position to an intermediate sealing position in which the partially inserted plasma generator seals the reactor; operating a remote controlled valve, which seals the reactor from the surroundings when the plasma generator is in an outer position, to open the valve when the plasma generator is in its said sealing position; moving the plasma generator by remote control into an operating position from said intermediate sealing position, while automatically electrically connecting first electrical contact means on the plasma generator to stationary second contact means; then moving the plasma generator into its operating position, with the aid of a remote-controlled locking means to press the plasma generator towards and lock it to the reactor and at the same time to connect the plasma generator to the return conductor to the current source.

A second aspect of this invention provides apparatus for effecting rapid, reliable and risk-free, pressure-tight connection of a plasma generator to a reactor comprising first electrical contact means arranged on the plasma generator; stationary second electrical contact means for connection to said first contact means; movable means, on a path fixed relative to the reactor, for moving the plasma generator towards or away from the reactor; sealing elements arranged on the reactor and plasma generator cooperating to seal the reactor from its surroundings when the plasma generator is in a partially installed sealing or a fully installed operating position; and remote controlled means for locking the generator to the reactor in its operating position and at the same time connecting the plasma generator to the return conductor to the current source.

Figure 2:
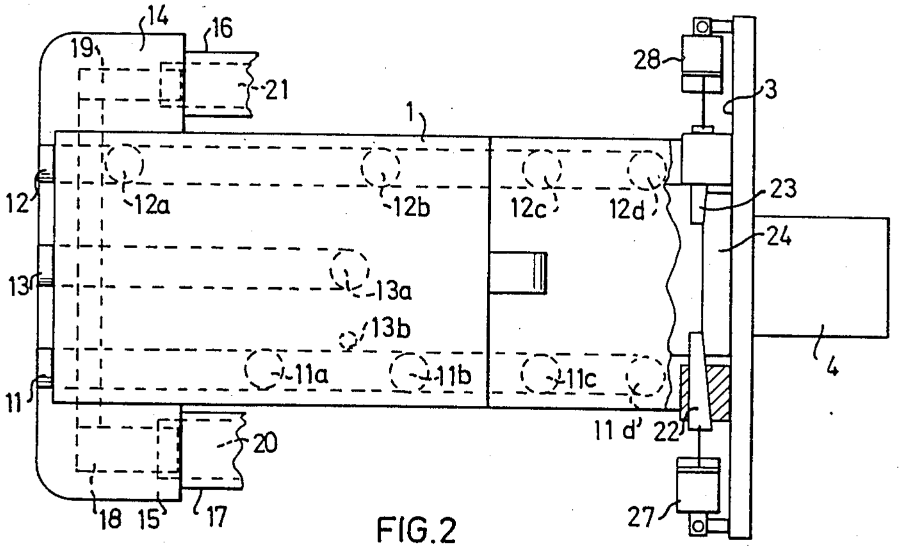

Futher features and advantages of the present invention will be revealed in the following detailed description, with reference to the accompanying drawings, in which FIG. 1 shows a side view of a plasma generator of one embodiment of the invention; and FIG. 2 shows an overhead plan of the means shown in FIG. 1.

FIG. 1 thus shows a plasma generator substantially enclosed by a cover 1 and fitted on a carrying plate 2. The plate 2 is mounted to travel towards and away from a reactor on a stand, 2A therefor. Here only a sealing surface 3, the lining 4 of the reactor tuyère, and a valve 5 are shown, the function of which will be described later. The plate 2 with the enclosed plasma generator is driven by means of two hydraulic rams 6 and 7 working in tandem. A lifting lug 8 is also provided to facilitate handling. It should be noted here that in the past plasma generators used to have outputs of about 1 MW, and were therefore relatively small, light-weight units which could easily be moved by a couple of people. Outputs nowadays are up to 6 to 10 MW, entailing weights of 500 kg, so the need for extra guide means is accentuated.

FIG. 2 shows an overhead plan view of the apparatus shown in FIG. 1. The respective connections 11 and 12 for supply and removal of coolant and 13 for the supply of gas, are arranged at the rear of the plate 2 and the pipes run below the plate and up through it for connection to respectively inlets and outlets 11*a–d*, 12*a–d*, 13*a–b*. The respective connections 14 and 15 for high voltage and low voltage are arranged on opposite sides of the cover 1 and the electrical transmission means themselves are substantially enclosed. The various contacts are brought into contact with stationary contacts 16, 17 on the stand or connected thereto. In the embodiment shown, the contacts on the plasma generator comprise thin sheet-metal pieces 18, 19, indicated by broken lines, and the stationary contacts comprise forks 20, 21, also indicated by broken lines.

The contact devices may of course be designed in various ways without departing from the scope of the invention as defined by the claims. The contacts on the plasma generator may, for instance, be arranged on movable arms instead of being stationary.

Locking bars 22, 23, preferably wedge-shaped and more preferably hydraulically controlled, are arranged on the reactor. These press the front portion 24 of the plasma generator against the sealing surface 3 which is arranged on the reactor and is provided with an O-ring seal 25, see FIG. 1.

The actual seal between plasma generator and the reactor can be effected in other ways, for instance by means of a bellows system where a cylindrical part surrounding the nose of the plasma generator is brought into sealing contact with a corresponding cylindrical part on the reactor and a seal is provided between these parts.

The following is one way of carrying out the procedure in accordance with the invention for connecting a plasma generator.

The enclosed plasma generator with its support plate 2 is placed on the stand in an outer a retracted position. From this outer position it is transported on plate 2 towards the reactor by activating one, 7, of the two hydraulic rams to an intermediate sealing position for the reactor. This means that the nose 26 of the plasma generator is partially inserted into the reactor tuyère 4, with the valve 5 in the tuyère 4 still closed. In this partially inserted position the valve 5 is opened and the plasma generator is moved home fully to its operating position by activation of the second hydraulic ram 6. The hydraulic cylinders 27, 28 are now activated, to push in the locking bars 22, 23 so that the plasma generator is pressed against the sealing surface 3 of the reactor and a pressure-tight seal is effected.

The lock cylinders preferably also have the function of electrically connecting the plasma generator to the return conductor to the current source, thus also ensuring that the current circuit cannot be connected until sealing is complete. When the plasma generator is moved from the sealing position to the operating position, the first contacts 14, 15 are also connected to the stationary second contacts 16, 17.

The great advantage of having two cooperating hydraulic rams 6, 7 is that the stroke length of the second rams 6 can be adjusted precisely so that when the generator is being exchanged it is moved from its operating position to its intermediate sealing position and the valve must then be closed before the second hydraulic ram 7 can be activated. If a single ram were to be responsible for the whole distance travelled there would always be the risk that the plasma generator 1 would pass the limit position, i.e. the intermediate sealing position. The result, for instance, a metal oxide reduction plant operating with over-pressure and extremely high temperatures, would be disastrous.

In the preferred embodiment described above, in which the plasma generator is pressed against a flat sealing surface arranged on the reactor, there is momentary leakage through the gap between plasma tuyere and generator nose while the plasma generator is being moved from the intermediate sealing position to the operating position. The gas leakage occuring is negligible, but in principle it can be eliminated totally by utilizing the bellows system mentioned above. As a further safeguard in such a bellows system, an overpressure can, if desired, be created between the two cylindrical parts before the valve is opened.

Many other variations of the design are of course feasible within the scope of the present invention as defined by the claims. The plasma generator need not in principle be arranged on a plate but could be totally enclosed by a cover suitably guided, for example by being suspended on rails or the like. Furthermore, if a plate is used, it may be controlled by sleeves in turn running on rails, instead of running on a stand.

Other control systems are also possible, instead of hydraulic operation of the remote-controlled functions, for example electric or pneumatic systems or combinations thereof may be used.

Futhermore, suitable connections for gas and coolant for the plasma generator can be arranged on a special contact device with quick-connections, the contact device being connected when the plasma generator is in its outer a retracted position. This connection is also preferably remote-controlled, for example by means such as hydraulic rams.

We claim:

1. In a method for connecting a plasma generator to a reactor which includes a selectively engageable electrical connection of the plasma generator to a return conductor to a current source, the improvement comprising the steps of:

(a) introducing the plasma generator to an intermediate position in which it is positioned in the tuyere of the reactor and at least partially seals the reactor, while maintaining closed a remote-control valve which seals the reactor from the surroundings when the plasma generator is fully withdrawn;
(b) opening said valve once the plasma generator is in its said intermediate sealing position;
(c) moving the plasma generator from said intermediate sealing position to a fully installed operating position, said movement of the plasma generator to said operating position simultaneously automatically engaging first electrical contact means on the plasma generator with stationary second electrical contact means; and
(d) operating remote-controlled locking means which both press the plasma generator against the reactor and lock it thereagainst, and simultaneously automatically engage said electrical connection of the plasma generator to the return conductor to the current source.

2. In an apparatus for connecting a plasma generator to a reactor which includes a selectively engageable electrical connection of the plasma generator to a return conductor of a current source, the improvement comprising:

(a) a guide fixed to the reactor;
(b) support means movable along said guide for supporting said plasma generator for movement from a first, fully retracted position, to a third, fully installed, operating position by way of a second, partially installed, position of the plasma generator in the tuyere of the reactor in which the plasma generator at least partially seals the reactor;
(c) means for moving said support means along said guide between said three positions;
(d) first electrical contact means on the plasma generator for supplying current to the generator;
(e) stationary second electrical contact means connected to a current source for the plasma generator and positioned to be simultaneously automatically engaged by said first electrical contact means as said plasma generator moves from said second position to said third position;
(f) sealing means on the reactor and the plasma generator and co-operating to seal the reactor from its suurroundings when the plasma generator is in said second position and said third position;
(g) remote-controlled locking means for locking the plasma generator in position in said operating position thereof; and (h) return electrical conductor means from said plasma generator to said current source by way of said remote-controlled locking means whereby operation of said remote-controlled locking means to lock the plasma generator in said operating position simultaneously automatically engages electrical connection of a current circuit between said current source and said plasma generator.

3. Apparatus according to claim 2, wherein said guide means consists of a stand and said support means comprises a plate supporting the plasma generator, said plate being movably mounted on the stand.

4. Apparatus according to claim 3, and further including a cover which, with said plate, completely encloses the plasma generator in said third position.

5. Apparatus according to claim 2, wherein said sealing means comprise a flat first surface to the plasma generator, cooperating second surface on the reactor, and sealing means between said first and second surfaces.

6. Apparatus according to claim 5, wherein said sealing means comprise O-ring seal means.

7. Apparatus according to claim 5, wherein said locking means comprises two hydraulically controlled locking bars for pressing the plasma generator against said second surface of the reactor.

8. Apparatus according to claim 7, wherein said locking bars are wedge shaped, and including hydraulic means for actuating said locking bars.

9. Apparatus according to claim 2, wherein said sealing means comprise first and second cylindrical elements insertable one into the other, and sealing means therebetween, said first sealing element being arranged on the reactor and said second sealing element being arranged on the front end of the plasma generator.

10. Apparatus according to claim 2, wherein said first contact means comprise sheet-metal members and said stationary second contact means comprise forks into which the sheet-metal members are automatically inserted during movement of the plasma generator from said second position to said third position.

11. Apparatus according to claim 2, and further including supply means for gas and coolant to said plasma generator, and special contact means adapted to connect said plasma generator to said gas and coolant supply means when said plasma generator is in its said third position.

12. Apparatus according to claim 11, wherein said special contact means for the coolant and gas connection is remote-controlled.

13. Apparatus according to claim 2, wherein said means for moving said support means along said guide comprise first power operated means operable to drive the support means between said first and second positions and second power operated means to drive the support means between the second and third positions.

14. In an apparatus for connecting a plasma generator to a reactor which includes a selectively engageable electrical connection of the plasma generator to a return conductor of a current source, the improvement comprising:

(a) a guide fixed to the reactor;

(b) support means movable along said guide for supporting said plasma generator for movement from a first, fully retracted position, to a third, fully installed, operating position, by way of a second, partially installed position of the plasma generator in the tuyere of the reactor in which the plasma generator at least partially seals the reactor;

(c) means for moving said support means along said guide between said three positions;

(d) first electrical contact means on the plasma generator for supplying current to the generator;

(e) stationary second electrical contact means positioned to be simultaneously engaged by said first electrical contact means as said plasma generator moves from said second position to said third position;

(f) sealing means on the reactor and the plasma generator and co-operating to seal the reactor from its surroundings when the plasma generator is in said second position and said third position;

(g) remote-controlled locking means for locking the plasma generator in position in said operating position thereof;

(h) return electrical conductor means from said plasma generator to said current source by way of said remote-controlled locking means whereby operation of said remote-controlled locking means to lock the plasma generator in said operating position simultaneously automatically engages electrical connection with a current circuit between said current source and said plasma generator; and (i) wherein said means for moving said support means along said guide comprise first power operated means operable to drive the support means between said first and second positions and second power operated means to drive the support means between the second and third positions.

15. Apparatus according to claim 14, wherein said guide means consists of a stand and said support means comprises a plate supporting the plasma generator, said plate being movably mounted on the stand.

16. Apparatus according to claim 15, and further including a cover which, with said plate, completely encloses the plasma generator in said third position.

17. Apparatus according to claim 14, wherein said sealing means comprise a flat first surface to the plasma generator, cooperating second surface on the reactor, and sealing means between said first and second surfaces.

18. Apparatus according to claim 17, wherein said sealing means comprise O-ring seal means.

19. Apparatus according to claim 17, wherein said locking means comprises two hydraulically controlled locking bars for pressing the plasma generator against said second surface of the reactor.

20. Apparatus according to claim 19, wherein said locking bars are wedge shaped, and including hydraulic means for actuating said locking bars.

21. Apparatus according to claim 14, wherein said seaing means comprise first and second cylindrical elements insertable one into the other, and sealing means therebetween, said first sealing element being arranged on the reactor and said second sealing element being arranged on the front end of the plasma generator.

22. Apparatus according to claim 14, wherein said first contact means comprise sheet-metal members and said stationary second contact means comprise forks into which the sheet metal members are automatically inserted during movement of the plasma generator from said second position to said third position.

23. Apparatus according to claim 14, and further including supply means for gas and coolant to said plasma generator, and special contact means adapted to connect said plasma generator to said gas and coolant supply means when said plasma generator is in its said third position.

24. Apparatus according to claim 23, wherein said special contact means for the coolant and gas connection is remote-controlled.

25. Apparatus according to claim 14, wherein said means for moving said support means along said guide comprise first hydraulically operated means operable to drive the support means between said first and second positions and second hydraulically operated means to drive the support means between the second and third positions.

* * * * *